United States Patent
Wang

(10) Patent No.: US 11,418,848 B2
(45) Date of Patent: Aug. 16, 2022

(54) DEVICE AND METHOD FOR INTERACTIVE VIDEO PRESENTATION

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

(*) Notice: Subject to any disclaimer, the term of this patent is extended or adjusted under 35 U.S.C. 154(b) by 235 days.

(21) Appl. No.: 17/008,326

(22) Filed: Aug. 31, 2020

(65) Prior Publication Data

US 2022/0070541 A1 Mar. 3, 2022

(51) Int. Cl.
| | | |
|---|---|---|
| *H04N 21/485* | (2011.01) | |
| *G06T 13/40* | (2011.01) | |
| *G06F 3/16* | (2006.01) | |
| *G06F 3/01* | (2006.01) | |
| *H04N 21/482* | (2011.01) | |
| *G06F 40/40* | (2020.01) | |
| *H04N 21/81* | (2011.01) | |
| *H04N 21/44* | (2011.01) | |

(Continued)

(52) U.S. Cl.
CPC ........... *H04N 21/485* (2013.01); *A63F 13/00* (2013.01); *A63F 13/53* (2014.09); *A63F 13/5378* (2014.09); *A63F 13/55* (2014.09); *G06F 3/017* (2013.01); *G06F 3/0481* (2013.01); *G06F 3/167* (2013.01); *G06F 40/40* (2020.01); *G06N 3/08* (2013.01); *G06T 13/40* (2013.01); *G06T 19/003* (2013.01); *H04N 21/4312* (2013.01); *H04N 21/44* (2013.01); *H04N 21/47205* (2013.01); *H04N 21/482* (2013.01); *H04N 21/8146* (2013.01); *H04N 21/8541* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 8,514,221 B2 * | 8/2013 | King | G06T 17/10 345/157 |
| 8,595,773 B1 | 11/2013 | Wang et al. | |

(Continued)

OTHER PUBLICATIONS

Robert McKee, "Story: Substance, Structure, Style and the Principles of Screenwriting," Harper-Collins Publishers, (1998).

(Continued)

*Primary Examiner* — Pierre E Elisca
(74) *Attorney, Agent, or Firm* — Anova Law Group, PLLC

(57) ABSTRACT

A method for interactive video presentation includes: obtaining, by an electronic device, video data corresponding to a story; presenting, through a display interface, a portion of the video data corresponding to a selected storyline path of the story; receiving, by the input interface, a user request for switching between a two-dimensional (2D) video streaming mode and a three-dimensional (3D) exploration mode; and in response to the user request being switching from the 2D video streaming mode to the 3D exploration mode: acquiring, by the processor, 3D video scenes with exploration options for an avatar, the 3D video scenes matched to a current story status and currently presented video data; and presenting, through the display interface, the 3D video scenes with the exploration options.

20 Claims, 8 Drawing Sheets

(51) Int. Cl.
  G06N 3/08      (2006.01)
  H04N 21/431    (2011.01)
  H04N 21/8541   (2011.01)
  H04N 21/472    (2011.01)
  A63F 13/00     (2014.01)
  A63F 13/53     (2014.01)
  A63F 13/5378   (2014.01)
  A63F 13/55     (2014.01)
  G06F 3/0481    (2022.01)
  G06T 19/00     (2011.01)

(56) References Cited

U.S. PATENT DOCUMENTS

| | | | |
|---|---|---|---|
| 8,831,902 B2 | 9/2014 | Wang | |
| 8,856,845 B2 | 10/2014 | Wang | |
| 8,869,211 B2 | 10/2014 | Wang | |
| 8,964,127 B2 | 2/2015 | Wang | |
| 9,082,092 B1* | 7/2015 | Henry | H04N 5/765 |
| 9,100,701 B2 | 8/2015 | Wang | |
| 9,866,913 B1 | 1/2018 | Wang | |
| 10,390,105 B1* | 8/2019 | Nijim | H04N 21/8133 |
| 2011/0164029 A1* | 7/2011 | King | G06T 19/00 |
| | | | 345/173 |
| 2012/0268410 A1* | 10/2012 | King | G06T 17/10 |
| | | | 345/173 |

OTHER PUBLICATIONS

Richard S. Sutton, et al., "Reinforcement learning an introduction-Second edition, in progress," (2018).

Rowan Zellers, et al., "From recognition to cognition: Visual commonsense reasoning," 2019.

Min Sewon, et al., "A Discrete Hard EM Approach for Weakly Supervised Question Answering," Proceedings of the 2019 Conference on Empirical Methods in Natural Language Processing and the 9th International Joint Conference on Natural Language Processing, pp. 2851-2864, Hong Kong, China, Nov. 3-7, 2019.

Tomáš Kočiský, et al., "The NarrativeQA Reading Comprehension Challenge," Transactions of the Association for Computational Linguistics, vol. 6, pp. 317-328, 2018.

Xinya Du, et al., "Learning to Ask: Neural Question Generation for Reading Comprehension," Proceedings of the 55th Annual Meeting of the Association for Computational Linguistics, pp. 1342-1352, Vancouver, Canada, Jul. 30-Aug. 4, 2017.

Bang Liu, et al., "Asking Questions the Human Way: Scalable Question-Answer Generation from Text Corpus," Apr. 20-24, 2020, Taipei, Taiwan.

"Interactive Film," Wikipedia, Retrieved from https://en.wikipedia.org/wiki/Interactive_film, Aug. 26, 2020.

"List of Interactive Titles on Netflix," What's on Netflix, Retrieved from https://www.whats-on-netflix.com/library/Interactive-titles-on-netflix/, Aug. 26, 2020.

Makarand Tapaswi, et al., "MovieQA: Understanding Stories in Movies through Question-Answering," 2016.

Antonia Hitchens, "Netflix's Carla Engelbrecht Chooses Her Own Adventures," Wired, Culture, Aug. 19, 2019, Retrieved from https://www.wired.com/story/culture-fan-tastic-planet-netflix-carla-engelbrecht/.

Craig Caldwel, "Story Structure and Development: A Guide for Animators, VFX Artists, Game Designers, and Virtual Reality," CRC Press, 2017.

Christopher Vogler, "The Writer's Journey: Mythic Structure for Writers-Third Edition," 2007.

Haohong Wang, et al., "A New TV Worid for Kids—When ZUI Meets Deep Learning," IEEE Conference on Multimedia Information Processing and Retrieval, 2018.

Quentin Galvane, "Automatic Cinematography and Editing in Virtual Environments," Graphics, Grenoble 1 UJF—Université Joseph Fourier, 2015. Part A.

Quentin Galvane, "Automatic Cinematography and Editing in Virtual Environments," Graphics, Grenoble 1 UJF—Université Joseph Fourier, 2015. Part B.

Volodymyr Mnih, et al., "Human-Level Control Through Deep Reinforcement Learning," Nature, vol. 518, Feb. 26, 2015.

V. Propp, "Morphology of the Folktale," vol. 9, University of Texas Press, 1968.

* cited by examiner

1. Scar sets a trap for his brother and nephew by luring Simba into a gorge (221202)

2. Simba is trampled by a large herd of wildebeest driven by the hyenas (221201)

3. Mufasa is informed by Scar of Simba's peril, and saves Simba (221202)

4. Mufasa ends up hanging perilously from the gorge's edge (211202)

5. Scar sends Mufasa falling to his death (001202)

6. Scar convinces Simba that the tragedy was Simba's own fault, and orders hyenas to kill the cub (001201)

7. Scar steps forward as the new king (002201)

FIG. 6A

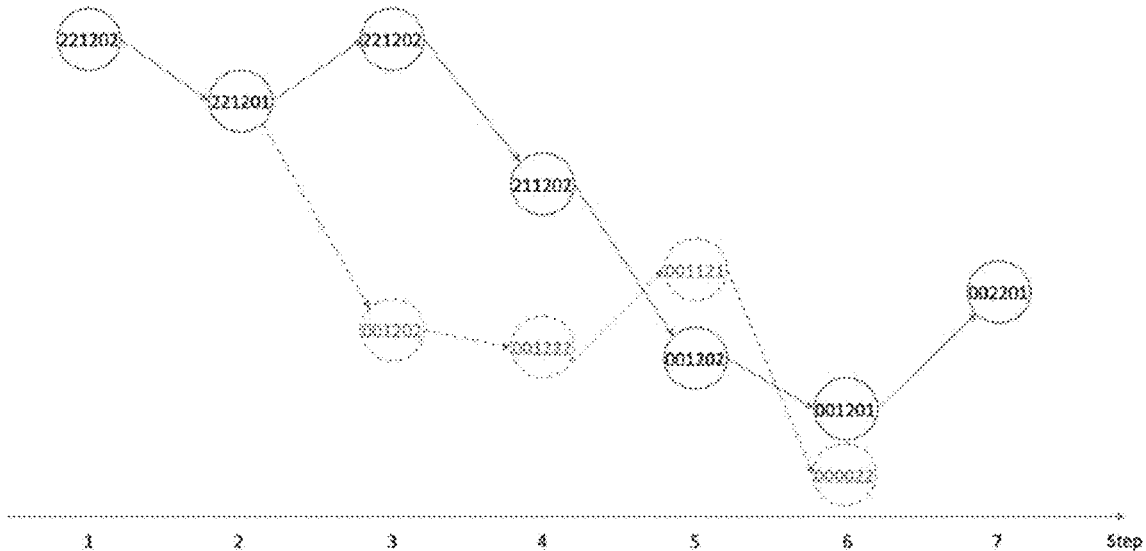

FIG. 6B

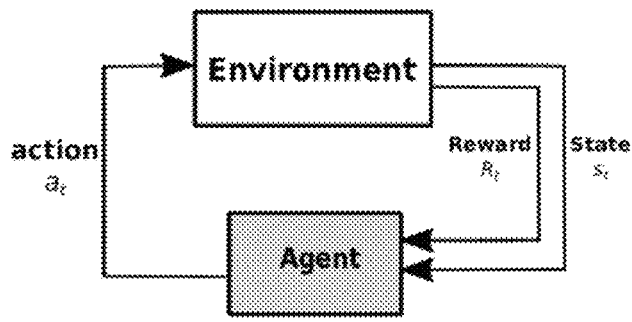

FIG. 7

I. The preparatory function of the donor:

Test, D¹ .....
Interrogation, D²  .....
   of a dying person, D* .....
   for mercy and freedom, D*⁶ .....
   for division, D* .....
   others, D⁷ .....
Attempt to annihilate, D* .....
Skirmish, D* .....
Proposal for an exchange, D¹⁰ .....

II. The forms of transmission of a magical agent:

F¹ Transference
F² Indication
F³ Preparation
F⁴ Sale
F⁵ Find
F⁶ Appearance
F⁷ Swallowing
F⁸ Seizure
F⁹ Offer of service(s)

FIG. 8

DEVICE AND METHOD FOR INTERACTIVE VIDEO PRESENTATION

TECHNICAL FIELD

The present disclosure relates to the field of content display technologies, and in particular, to a device and a method for interactive video presentation.

BACKGROUND

For decades, TV is the most influential entertainment device. Many technologies and innovations have been deployed in the field to enhance this experience. For example, the frequency of user interaction and/or the clicks on the keys of the remote control was considered as a basic metric to evaluate the performance of a TV, based on an assumption that TV is relaxed experience that needs as less user interaction as possible. In certain other examples, sensing-based automatic user identification learning approached were studied and personalized recommendations were proposed to speed up the user interaction process in front of TVs. Certain applications explored TV content layout structure and organization, and provided a zoomable user interaction mechanism that enables a much quicker content search and selection process. In certain other applications, object-level access and interaction tasks during TV watching were investigated to enable users to handle experiences like TV shopping and information retrieval in a real-time manner.

With the emerging of interactive films, stories are formatted differently from traditional way in that periodically the protagonist faces two or three options, each of which leads to more options, and then to one of many endings. It is found that the introduced unpredictability may encourage users for possible repeat watching. However, the frequent interaction requirement for the users in front of TV makes it not favorable for users preferring a more relaxed style.

Therefore, methods and devices are needed for improving experience in video watching and balancing the tradeoff of keeping the beauty of unpredictability and not exceedingly interrupting the users.

SUMMARY

In one aspect of the present disclosure, a method for interactive video presentation is provided. The method includes: obtaining, by an electronic device, video data corresponding to a story; presenting, through a display interface, a portion of the video data corresponding to a selected storyline path of the story; receiving, by the input interface, a user request for switching between a two-dimensional (2D) video streaming mode and a three-dimensional (3D) exploration mode; and in response to the user request being switching from the 2D video streaming mode to the 3D exploration mode: acquiring, by the processor, 3D video scenes with exploration options for an avatar, the 3D video scenes matched to a current story status and currently presented video data; and presenting, through the display interface, the 3D video scenes with the exploration options.

In certain embodiments of the method, acquiring 3D video scenes with exploration options includes: generating a movement path for the avatar in a 3D space; and acquiring 3D environment scene changes according to the movement path.

In certain embodiments of the method, acquiring 3D video scenes with exploration options further includes: receiving user instructions to operate the avatar in the 3D space; and generating the movement path according to the user instructions.

In certain embodiments of the method, acquiring 3D video scenes with exploration options further includes: generating and presenting animation contents corresponding to interactions between an object in the 3D space and the avatar.

In certain embodiments of the method, the interactions between the object and the avatar includes a dialog, and the object expresses, during the dialog, one or more of: a lawful opinion, a chaotic opinion, a wise opinion, an educational opinion, or a random opinion.

In certain embodiments of the method, the 3D video scenes with exploration options are generated using neural network processing based on trained models of character responses.

In certain embodiments of the method, the story is hyper-story including a plurality of storyline paths, and further including a plurality of character statuses corresponding to a plurality of story characters at a plurality of time points of the story; and the method further includes: receiving, via an input interface, a user input of a preferred story development; and identifying, by the processor, the selected storyline path from the plurality of storyline paths of the hyper-story according to the preferred story development.

In certain embodiments of the method, the user input for the preferred story development includes a voice input or a hand gesture input; and the method further includes interpreting the user input to determine the preferred story development, including: performing a natural language processing to convert the user input to a wish command; or performing a hand gesture analysis to determine a user selection from a menu displayed by the displayed interface.

In certain embodiments of the method, identifying the selected storyline path according to the preferred story development includes: obtaining, by the processor, a directed acyclic graph (DAG) matrix having a size of M×N to represent a DAG space of the hyper-story, M being a number of all combinations of character statuses for the plurality of story characters, N being a number of the time points, and each vertex of the matrix representing a combination of character status at a time point; identifying, by the processor, a starting vertex in the matrix corresponding to a current time point and a current combination of character statuses; performing, by the processor, a minimization process of a wish-realization-distance (WRD) function to identify a connection path connecting a plurality of vertexes in the DAG space, the connection path starting at the starting vertex and ending at an outcome vertex, wherein the minimization process dynamically measures and minimizes a distance between the preferred story development and a realization process represented by the connection path while taking into account one or more of: a matching degree of wish and realization, a story and video quality of the realization process, a latency between wish making and realization, and potential user exploration opportunities during the process.

In certain embodiments of the method, the minimization process of the WRD function includes: calculating, by the processor, a matching degree between the preferred story development and the outcome of the connection path; calculating, by the processor, a latency factor accounting for a minimum time duration of all paths between the starting vertex and the outcome vertex; calculating, by the processor, an opportunity factor accounting for a maximum total number of scenes of all paths between the starting vertex and the outcome vertex; calculating, by the processor, a quality factor accounting for a minimum quality of all steps in the connection path; calculating, by the processor, the WRD function as a weighted sum of the matching degree, the latency factor, and the opportunity factor, wherein a first weighting coefficient for the matching degree<=0, a second weighting coefficient for the latency factor>=0, and a third weighting coefficient for the opportunity factor>=0; and identifying the connection path by finding a path corresponding to a minimum value of the WRD function while maintaining the quality factor above a threshold.

In certain embodiments, the method further includes: before presenting the portion of the video data corresponding to the selected storyline path, notifying, by the display interface, the latency for the realization and a confidence level of the realization.

In another aspect of the present disclosure, a device for performing computer-aided diagnosis (CAD) based on a medical image. The device includes: a memory storing computer-executable instructions; and a processor, coupled with the memory and, when the computer-executable instructions being executed, configured to: obtain video data corresponding to a story; present, via a display interface, a portion of the video data corresponding to a selected storyline path of the story; receive a user request for switching between a two-dimensional (2D) video streaming mode and a three-dimensional (3D) exploration mode; and in response to the user request being switching from the 2D video streaming mode to the 3D exploration mode: acquire 3D video scenes with exploration options for an avatar, the 3D video scenes matched to a current story status and currently presented video data; and presenting, via the display interface, the 3D video scenes with the exploration options.

In certain embodiments of the electronic device, the processor is further configured to:

generate a movement path for the avatar in a 3D space; and acquire 3D environment scene changes according to the movement path.

In certain embodiments of the electronic device, the processor is further configured to: receive user instructions to operate the avatar in the 3D space; and generate the movement path according to the user instructions.

In certain embodiments of the electronic device, the processor is further configured to: generate and present animation contents corresponding to interactions between an object in the 3D space and the avatar.

In certain embodiments of the electronic device, the interactions between the object and the avatar includes a dialog, and the object expresses, during the dialog, one or more of: a lawful opinion, a chaotic opinion, a wise opinion, an educational opinion, or a random opinion.

In certain embodiments of the electronic device, the story is hyper-story including a plurality of storyline paths, and further including a plurality of character statuses corresponding to a plurality of story characters at a plurality of time points of the story; and the processor is further configured to: receive, via an input interface, a user input of a preferred story development; and identifying the selected storyline path from the plurality of storyline paths of the hyper-story according to the preferred story development.

In certain embodiments of the electronic device, the user input for the preferred story development includes a voice input or a hand gesture input; and the processor is further configured to: perform a natural language processing to convert the user input to a wish command; or perform a hand gesture analysis to determine a user selection from a menu displayed by the displayed interface.

In certain embodiments of the electronic device, the processor is further configured to: obtain a directed acyclic graph (DAG) matrix having a size of M×N to represent a DAG space of the hyper-story, M being a number of all combinations of character statuses for the plurality of story characters, N being a number of the time points, and each vertex of the matrix representing a combination of character status at a time point; identify a starting vertex in the matrix corresponding to a current time point and a current combination of character statuses; perform a minimization process of a wish-realization-distance (WRD) function to identify a connection path connecting a plurality of vertexes in the DAG space, the connection path starting at the starting vertex and ending at an outcome vertex, wherein the minimization process dynamically measures and minimizes a distance between the preferred story development and a realization process represented by the connection path while taking into account one or more of: a matching degree of wish and realization, a story and video quality of the realization process, a latency between wish making and realization, and potential user exploration opportunities during the process.

In certain embodiments of the electronic device, the processor is further configured to: calculate a matching degree between the preferred story development and the outcome of the connection path; calculate a latency factor accounting for a minimum time duration of all paths between the starting vertex and the outcome vertex; calculate an opportunity factor accounting for a maximum total number of scenes of all paths between the starting vertex and the outcome vertex; calculate a quality factor accounting for a minimum quality of all steps in the connection path; calculate the WRD function as a weighted sum of the matching degree, the latency factor, and the opportunity factor, wherein a first weighting coefficient for the matching degree<=0, a second weighting coefficient for the latency factor>=0, and a third weighting coefficient for the opportunity factor>=0; and identify the connection path by finding a path corresponding to a minimum value of the WRD function while maintaining the quality factor above a threshold.

In certain embodiments of the electronic device, the processor is further configured to: before presenting the portion of the video data corresponding to the selected storyline path, notify, via the display interface, the latency for the realization and a confidence level of the realization.

In another aspect of the present disclosure, a non-transitory computer-readable storage medium is provided. non-transitory computer-readable storage medium stores a plurality of instructions, wherein when the plurality of instructions are executed by a processor, cause the processor to: obtain video data corresponding to a story; present, via a display interface, a portion of the video data corresponding to a selected storyline path of the story; receive a user request for switching between a two-dimensional (2D) video streaming mode and a three-dimensional (3D) exploration mode; and in response to the user request being switching from the 2D video streaming mode to the 3D exploration mode: acquire 3D video scenes with exploration options for an avatar, the 3D video scenes matched to a current story status and currently presented video data; and presenting, via the display interface, the 3D video scenes with the exploration options.

BRIEF DESCRIPTION OF THE DRAWINGS

In order to more clearly illustrate the technical solutions according to the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

FIG. 6A illustrates story segments of s specific story according to certain embodiments of the present disclosure;

FIG. 6B illustrates a DAG representation of the story shown in FIG. 6A;

FIG. 7 illustrate a reinforcement learning method;

FIG. 8 illustrates an example of function connections in a story;

DETAILED DESCRIPTION

The technical solutions according to the embodiments of the present disclosure are described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The present disclosure provides a device and method for interactive video presentation. In particular, the method provided by the present disclosure extends user interaction capability from only making wishes outside a TV to being able to experience (e. g., via their own avatar) and explore inside three-dimensional (3D) story scenes. The features provided the method may bring more values to users such as understanding background, getting clues, observing visual details, and receiving suggestions, and so on. The interaction may be made by an input device, e.g., by hand (if using a touch-screen or using gesture-recognition mechanism), by voice command, by head motion (if using a head-mount devices), by a remote control or a mouse, by mobile phones and mobile devices, or by IoT devices such as toys. The TV may recognize the user's interaction and manage an avatar that represents the user in the 3D story scene.

It is noted that the general term "TV" used in the present disclosure is not limited to a television. "TV" may refer to all video entertainment system that also include projection-based, PC-based, set-top-box/stick based, and mobile-based devices, and so on.

Figure 1A:
FIG. 1A illustrates an example of interactive video presentation experiences.
Figure 1B:
FIG. 1B illustrates another example of interactive video presentation experiences.
Figure 1C:
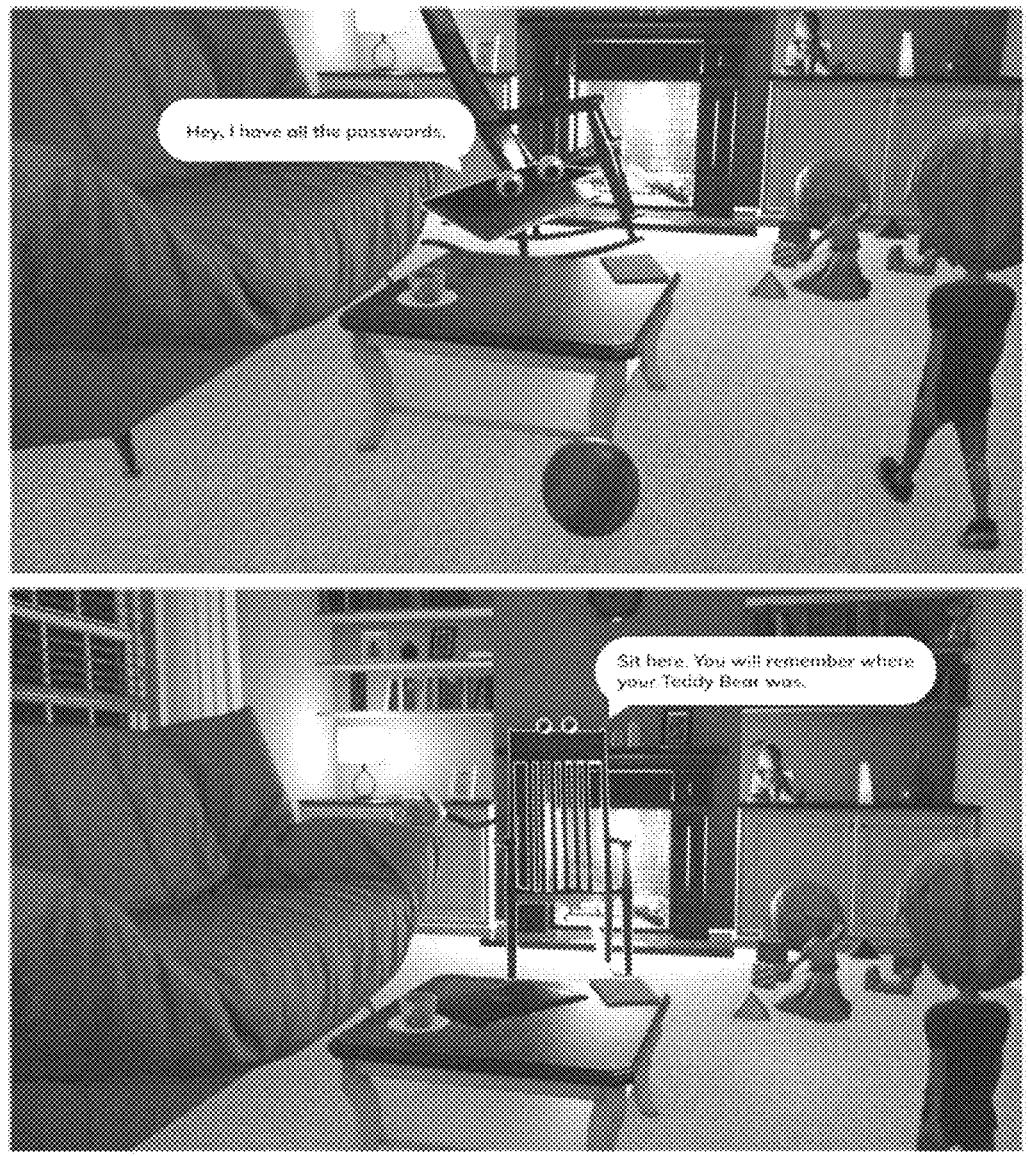
FIG. 1C illustrates another example of interactive video presentation experiences.

FIGS. 1A-1C illustrate an example of presenting 3D exploration scenes. As shown in FIGS. 1A-1C, an avatar in the 3D exploration scene in FIG. 1B may behave (e.g., moving, speaking) according to user's intention. In addition, some of the objects in the 2D video (shown in FIG. 1A) may become alive in the 3D scene exploration (shown in FIG. 1C) and be able to interact with each other or with the avatar. These objects may be story-smart that may provide story background, clues, and suggestions to user (via the interactions with avatar). With the user's permission, the avatar can explore the 3D scene and conduct the interactions with alive objects by itself, under such condition, the exploration experiences may revert back to the viewing experience for user.

Figure 2:
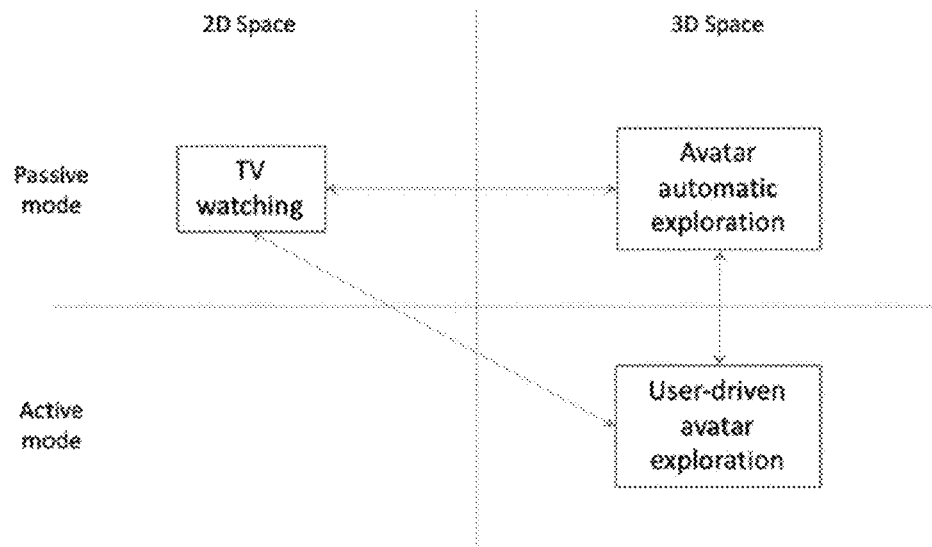
FIG. 2 illustrates switching between different modes of interactive video presentation according to certain embodiments of the present disclosure.

As illustrated in FIG. 2, certain embodiments of the present disclosure allows a user to freely switch between 2D and 3D spaces and between passive and active modes by switching among three scenarios, namely, TV watching in 2D, viewing the avatar automatic exploration in a 3D space, and driving the avatar to explore in 3D space. This interactive experience may be termed as IDEO (Interactive viDEO), which includes the anytime free switching between 2D video frame to 3D story scene and vice versa, the collaborative exploration experiences with many 3D story-smart objects and an avatar, and anytime guiding story future direction with interaction (e.g., making a wish).

According to certain embodiments, the IDEO system may provide one or more of the following features:

1) switching between 2D and 3D spaces with a simple interaction (e.g., click a remote button, with a gesture, or with a voice command);
2) managing both the 2D video data and 3D scene data, making them match with each other seamlessly (i.e., finding associated 3D scene for any video moment), and in case of 3D data not being available, supporting 2D video playback functionality;
3) rendering 3D scene associated with the current 2D video frame in real-time once the user switch from 2D to 3D, providing a solution with collaborative computation enabled by multiple devices and/or cloud computing resources;
4) training story-smart objects as well as a user avatar with story knowledge obtained from available stories;
5) dynamically guiding story-smart objects and avatar to interactive collaboratively;
6) guiding the user avatar to automatically explore the 3D scene when needed (e.g., when user set the avatar at automatic mode); and
7) realizing a user's wish by dynamically adjusting a path selection of a story branch inside a hyper-story network.

Figure 3:
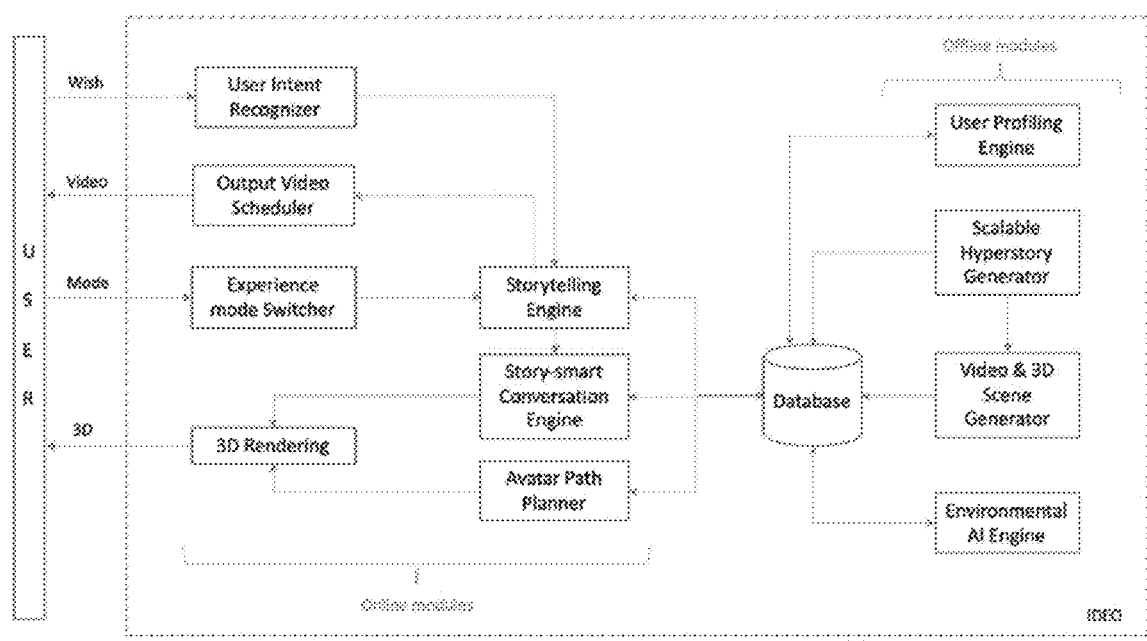
FIG. 3 illustrates functional units according to certain embodiments of the present disclosure.

FIG. 3 illustrates functional units according to certain embodiments of the present disclosure. As shown in FIG. 3, a user may interact with TV using a simple interaction model, that is, at any time when the user makes a wish via an interaction, the TV may recognize the user's immediate intention, and then dynamically guide the storytelling engine to meet his/her expectation, and notify the user with a feedback message about when his/her wish may be realized (either in short-term or long-term). The user may switch among an experience mode (as shown in FIG. 2) at any time, and the TV will deliver either 2D video or rendered 3D scenes accordingly. In the 3D mode, a story-smart conversation engine may enable the conversation of smart objects and avatar, and an avatar path planner may guide the avatar's automatic navigation in the scene (if the user choose not to drive avatar by himself/herself).

In FIG. 3, the main functional units of IDEO are demonstrated in the dash box. It is noted that it is a conceptual diagram that not requires all components to be in a physical TV box, instead, the components may be implemented either in the TV software, or as a cloud services, or as a service provided by another device, that the TV software may access and use. In FIG. 3, the modules on the left are categorized as "online modules" which require the system to provide immediate computational resources and generate instant responses. The modules on the right are categorized as "offline modules" which allows offline computation or process that do not require instant outcome. The categorizations are based on a conceptual point of view, which do not require the implementation to strictly follow. In other words, in the practical implementation of the IDEO system, the modules may be determined whether online or offline based on the practical condition of the system setup and associated requirements.

Figure 4:
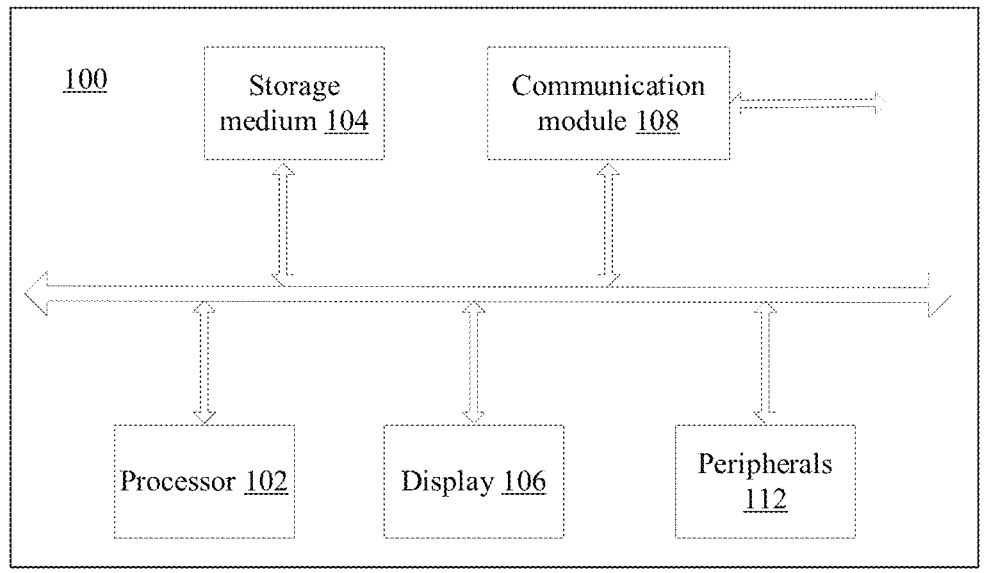
FIG. 4 illustrates hardware implementation of an IDEO device according to certain embodiments of the present disclosure according to certain embodiments of the present disclosure.

FIG. 4 illustrates an example of hardware implementation of the IDEO device 100 according to certain embodiments of the present disclosure. As shown in FIG. 4, the IDEO device 100 may be configured to interactively present 2D and 3D video scenes. In some embodiments, the IDEO device 100 may include computing device including a processor 102 and a storage medium 104. The IDEO device 100 may further include a display or other output unit 106, a communication device 108, and additional peripheral devices 112. Certain devices may be omitted, and other devices may be included. Processor 102 may include any appropriate processor(s). In certain embodiments, processor 102 may include multiple cores for multi-thread or parallel processing. Processor 102 may execute sequences of computer program instructions to perform various processes, such as a neural network processing program. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs and instructions for implementing various processes, when executed by processor 102, cause the processor to perform various steps of generating and presenting 2D and 3D video scenes. The communication module 108 may include network devices for establishing connections through a network. Display 106 may include any appropriate type of display device or electronic device display (e.g., CRT or LCD based devices, touch screens, VR headsets, etc.). Peripherals 112 may include additional I/O devices, such as a keyboard, a mouse, a camera, a microphone, and so on. The processor 102 may be configured to execute instructions stored on the storage medium 104 and perform various operations related to the IDEO method as detailed in the following descriptions.

Referring back to FIG. 3, the Scalable Hyper-story Generator is configured to generate a storyline according to a user's wish. A key difference between a hyper-story and a regular story is that the hyper-story contains many stories inside, and each story has a unique path depending on the options the system creates and choices the characters may take. The hyper-story may be generated manually or could be automated by a computing device. At difference stages of the storyline, the story may have different quality levels and thus may be suitable for different groups or numbers of audiences. Advantage of using a scalable hyper-story generator is that it allows different branches of the hyper-story to be in various quality levels, and the quality can be refined in a scalable manner from time to time.

As its name indicates, hyper-story refers to a network of stories. In certain previous work, 31 functions of dramatis personae have been extracted and abstracted to serve as the fundamental structural components to represent fairytale stories. In other words, any tale may be represented as a sequence of concatenated functions.

Figure 5:
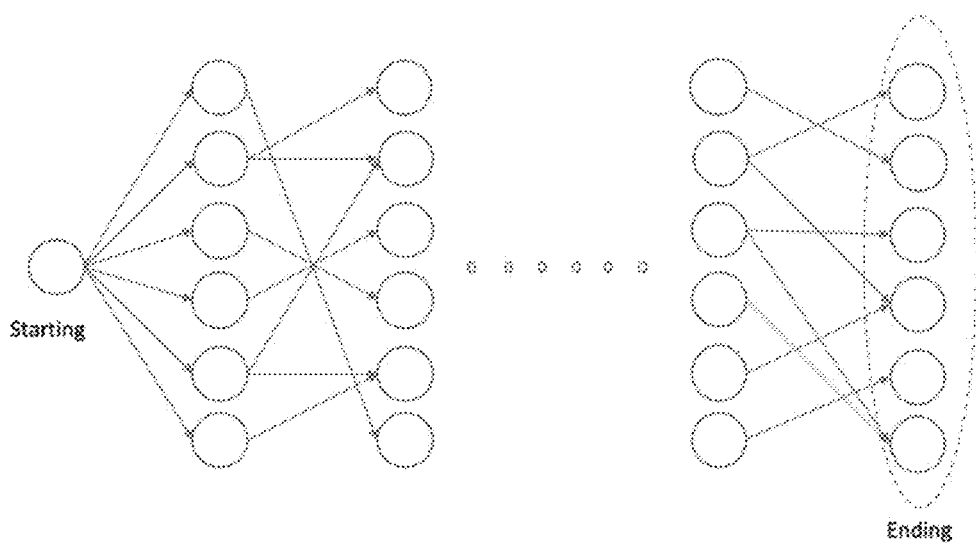
FIG. 5 illustrates an example of a DAG representing a hyper-story according to certain embodiments of the present disclosure.

In the present disclosure, a directed acyclic graph (DAG) may be used to represent a hyper-story. FIG. 5 shows an example of a DAG representing a hyper-story. Each vertex in the DAG represents a status combination of all main characters, and a directed edge from one vertex to another represents an event that causes the status changes of these characters. In the hyper-story DAG shown in FIG. 5, there is a single starting vertex because the setting of all stories contained in the hyper-story are the same at the beginning, but there are more than one end vertices due to the fact that many endings for various stories may be generated during the story creation process. Clearly any one of the multiple paths from starting vertex to the end vertices could be a possible story as long as the basic criteria of a good story is satisfied. The edges from one vertex to multiple vertices are considered as multiple branches of the story graph.

A well-known movie/story, Lion King, may be used as an example, to demonstrate the DAG structure of FIG. 5. In the story, there are 3 main characters, namely Mufasa, Scar and Simba. The story touches heavily on the 2 layers of the Maslow's hierarchy of needs theory, Kingship and Live/Death. In one example, Kingship=0 may represent not thinking of kingship. Kingship=1 may represent eager to get kingship. And Kingship=2 may represent securing kingship. Live=0 may present being dead, 1 represents being in danger, and 2 represents living without immediate danger. With these quantifications, the status of all 3 characters may be represented by a 6-tuple consists of Kingship and Live value of all 3 characters including Mustafa, Scar and Simba. FIG. 6A illustrates story segments of Lion King according to the above scheme. As shown in FIG. 6A, a portion of the story with 7 segments (or steps) may be represented by the 6-tuple consists of Kingship and Live value of all 3 characters.

FIG. 6B illustrates a DAG representation of the story shown in FIG. 6A. As shown in FIG. 6B, the DAG representation of the above story may be represented by the path of the solid lines, where each vertex represent the status in each step, and each edge represents the transition from one status to another. By adding the vertices and edges in dashed lines, a new story may be formed as an example. From the status transition, the storyline may be completed by the steps. For example, the edge from (221201) to (001202) may refer to the development that Mustafa saves Simba but loses his own life. The edge from (001202) to (001222) may refer to the development that Simba steps forward as the new king. As can be imagined, the space for new story generation may be large in the DAG structure, which is relevant to the number of the steps of a story. In addition, the duration of the story may vary even the number of steps of a story is fixed, which is highly relevant to the actual time duration according to these steps and the edit and cut process in the video post-processing stage.

Referring back to FIG. 3, in order to make a story in text format deliverable to user via the format of movie or video animation, an automatic (or semi-automatic) workflow is required to generate a video from a screenplay or other formats of a story. Auto-cinematography technology have been demonstrated to achieve this goal. The Video Scene Generator module takes input from the hyper-story generator and create video accordingly and then store the video in a database. In the meantime, the 3D scene associated with the video may also be stored, so that the user may enter the 3D scene (via the avatar) anytime during the video playback process.

In order to serve the user to the maximum, the system needs to understand the user's preferences through his/her patterns of interactivities with TV. The User Profile Engine processes the user behavior in front of TV (e.g., how often wishes are made, how much 3D exploration is done, and so on) being collected, builds profiles for every user, and models their behavior and preferences.

In order to make the objects in the 3D scene look and behavior alive, an AI-based approach may be used to support human-like dialogue as well as to indicate story-smart characteristics. On the other hand, when the avatar is allowed to navigate the scene by itself, an AI engine is required to guide its movement and interactivities with surrounding objects. The Environmental AI engine is configured to perform these tasks. Training may be conducted offline, and the trained models may be stored in the database for the online modules such as story-smart conversation engine and avatar path planner to use.

A story typically includes a transition of story development through a number of scenes. In a traditional movie, audiences may enjoy viewing the projected 2D images of the story scenes, as the current movie setting (if not a 3D movie) does not support user to enter the 3D scene in the middle of the video watching experiences. However, according to surveys, many users like the idea of being able to enter a video scene to explore in the 3D space, and they are very positive about having objects alive (e.g., human-like objects) and would like to interact with the objects via conversations and guidance. The majority of users may like to receive information related to a story, but they may also be interested in character information and small talks for more realism and variety. Many people also stated that that story clues would be useful.

Story-smart objects may be an object in the scene personified in the context of the storyline or the scene. Story-smart objects in a 3D environment may include a number of different roles or opinions, for example, expressing:
1) lawful opinion—where the story-smart object represents voices of lawful characters who respect authority, honor tradition, and judge those who fall short of their duties;
2) chaotic opinion—where the story-smart object represents voices of chaotic characters who follow their consciences, resent being told what to do, and favor new ideas over tradition;
3) wise opinion—where the story-smart object represents voices of wiseman who has better insights on future and more clues of unseen possibilities;
4) educational opinion—where the story-smart object represents voices of insider who knows the background and inside knowledge/information of all characters and story-related objects; and
5) random opinion—where the story-smart object provides information relevant or irrelevant to the story, sometimes sounds silly and funny to audiences.

In certain embodiments, certain objects may have 2-way conversation with user, or a user avatar when the user accesses the 3D scene via an avatar. The user may guide the direction of avatar's movement, or authorize the avatar to move around and take actions automatically. The automation of avatar and these objects may be realized by the AI algorithms.

According to certain embodiments, the Environment AI Engine is deployed to support the smart objects and avatar in the following tasks:
1) avatar navigation in the 3D scenes; and
2) story-smart conversations of the smart objects and the avatar.

The training of the AI models may be taken offline, and the trained models may be stored in a database for other online modules to use. For avatar automatic navigation, the tasks at hand may include:
1) an avatar (representing the user) walking around the 3D space, checking out some interesting details (e.g., viewing a map closely), and interacting/communicating with the smart objects, and after navigation is completed, going back to the 2D video watching experience; and
2) the user watching the performance of the avatar in a laid-back mode, but may give guidance to avatar from time to time (e.g., checking out something interested).

The problem to be solved may be defined as: given the 3D scene floor plan containing a number of objects/details (category, location info, etc.) to explore and user exploration history (objects explored and time info) for every experiences, determining the avatar's exploration sequence for the K objects selected that satisfies user's expectation.

A reinforcement learning approach, as illustrates in FIG. 7, may be applied to solve the problem. The Environment in FIG. 7 is the 3D scene with the objects/details that the agent may check out. The possible actions for the agent are 9-directional movements (assuming when the avatar is within a surrounding box of an object/details, the interaction will occur automatically) and switch (to 2D video playback mode). The reward system may be designed as follows:
(1) Every movement action gets negative reward −1.0.
(2) Every movement action after a time period (typical user's average exploration time) gets negative reward −2.0.
(3) Checking out a new object/detail gets various positive reward according to the user's preference level (which may be derived based on the history data), the higher preference (the guidance instruction/request from user is treated as the top preference) the higher reward the agent will receive.

The model may be implemented with Deep Q-network (DQN). After many iterations of training, the trained model may guide the avatar to quickly determine a good routine to explore the categories of objects/details that user may prefer within a good timing control. The variable time to be spent for conversation between avatar and smart objects may be jointly considered in the framework to make the outcome more attractive.

For story-smart conversations, the IDEO may include 3 types of conversations, including:
1) Type A: one-way comments (e.g., comments from a smart object);
2) Type B: answer for a question (e.g., smart object answers user's question); and
3) Type C: two-way conversation (e.g., avatar asks a question and the smart object answers).

When "story-smart" is considered, all 3 types of conversations may be narrowed down to story-related topics. For type A, the expectation would be that IDEO may derive story trend from the current stage of the story development based on the knowledge of the story commonsense or the already exist hyper-story. FIG. 8 shows an example of function connections in stories. As shown in FIG. 8, the functions in stories have patterns in connection with each other. Thus, a rule-based mechanism may be used to derive the possible next function given the current function found in the current status of the story. The character status represented by a 6-tuple in the foregoing description clearly supports the same logic, where the rule-based mechanism may be used to derive the possible next status of characters. The rules may be established by existing knowledge and analysis, learned from existing movies/stories, or learned directly from the current hyper-story, or a mix of all these sources. In general, once the guess of next step information is available, a sentence may be formed to express it out by using a template-based language generation method.

For Type B, the intelligence level required is higher than Type A, as the system is required to understand the story (or part of the story), understand the question covering what, who, why, how, where, which, how many/much, when, and so on, and be able to address them. Various training datasets as well as AI algorithms may be used to solve this problem.

The difference between Type C and Type B is that Type C requires avatar to ask reasonable human-like questions. Indeed, the question generation has been studied recently, where reasonable questions may be generated by AI algorithms. By combining the question generation and question answering, IDEO may handle the Type C conversation using a combined AI algorithm.

Referring back to FIG. 3, the modules characterized as online modules handle interaction with the user to receive requests and deliver outcomes. The online modules utilize the data and models stored in the database to conduct instant intelligent actions, such as activate objects' performance and conversations, and the avatar's self-navigation and so on, to produce a novel experience of IDEO.

The User Intent Recognizer receives the user interaction and interpret it as the current wish from the user. If the user uses voice input to explicitly express his/her wish, for example, "I hope Susie can survive", the recognizer may use NLP (natural language processing) to understand who, when, what from this instruction and convert it to a template of wish command, like "Susie (who)+Survive (future status)". If the user uses a hand gesture or by operating on a remote control buttons to express a wish (with the help of menu selections), for example, select a character (e.g., John) on screen and then select "Go to Jail" in a pop-up menu to express the wish of "Put John in Jail", the recognizer may get his/her intention right away. There are many ways for use to indicate their desire, the User Intent Recognizer is tasked to understand the user's immediate needs and send them to the Storytelling Engine.

The Storytelling Engine is the kernel of the online system, as it determines how to respond to the user's wish based on the existing availability of the stories in the hyper-story. A novel workflow may be deployed in the system to balance multiple factors such as realization latency (i.e. the duration between the wish is made and a realization video is shown), story quality, response-to-wish confidence level, the diversity of 3D scenes for exploration, and so on, to find the best story branch to meet user's expectation as well as the best path to get to there. After a decision is made, the Storytelling Engine may notify the user in how long his/her wish will be realized with a level of confidence. Depending on the availability of story branches, the IDEO system may try to find an optimal solution and notify user sometimes even if the confidential level is not high enough.

The key responsibilities of Storytelling Engine include:
1) given the user's immediate wish, finding an optimal solution (i.e., the future path of the story in the hyper-story network) to satisfy user's desire based on the availability of story branches as well as the user's preferences observed in his/her behavior patterns; and
2) supplying the story trend to the Story-smart Conversation Engine, so that the smart objects and the avatar will be able to demonstrate their insightful clues and actions with the guidance of the AI model trained by the Environmental AI Engine.

Figure 9:
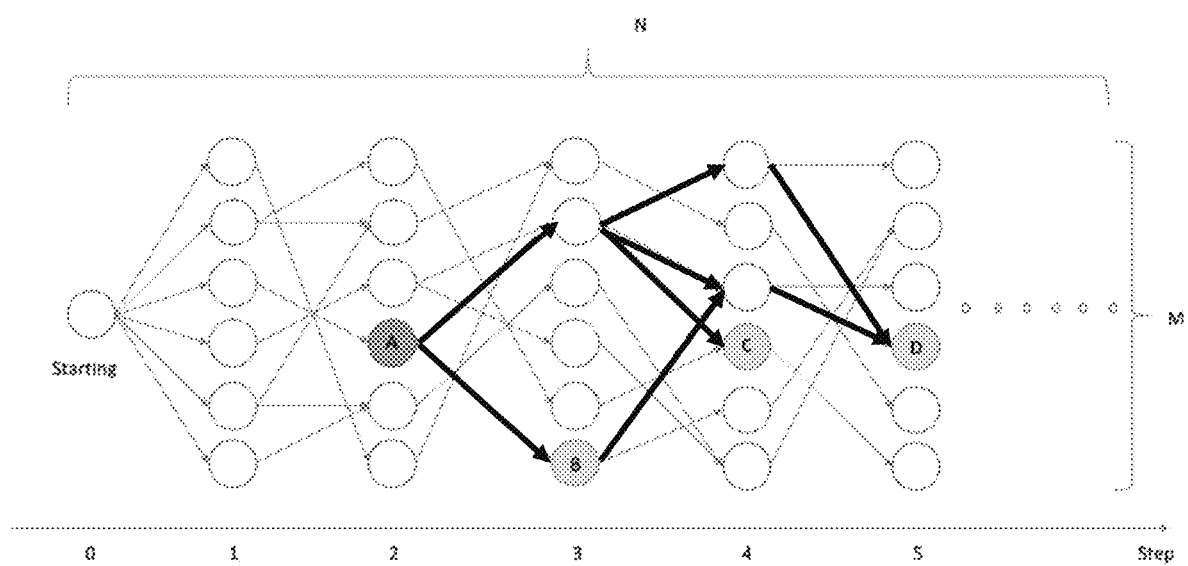
FIG. 9 illustrates a DAG diagram representing a hyper-story according to certain embodiments of the present disclosure.

Integer N represents number of steps in the hyper-story shown in FIG. 6A and FIG. 6B. N could be a small number if only the key development of the character status changes are considered, but it could also be a large number when the actions of characters and emotional changes are zoomed-in and more factors are considered in the state of characters. When N is sufficiently large, for example, the movies are divided into N steps and in average each step occupies at most one minute (or even less), then we are able to convert the continuous world of time into a discrete world of steps. On the other hand, it is reasonable to claim the number of all possible character status is limited. Integer M represents the number of all combinations of character status, thus the DAG space demonstrated in FIG. 6A and FIG. 6B may be represented by a vertex matrix of size M×N as illustrated in FIG. 9. The element $V_{i,j}$ (i<N, j<M) represents the ith column and jth row vertex in matrix of the FIG. 9, then the problem of storytelling engine may be represented by: given a current wish made at time near step x and the associate current vertex $V_{x,y}$, a vertex of $V_{rx,ry}$ and the path that bridge $V_{x,y}$ and $V_{rx,ry}$ are required to be selected from all the possibilities to realize the wish. In FIG. 9, point A is marked as an example vertex corresponding to the current wish point, and vertices B/C/D are possible realization point, and the possible paths from A to B, C, and D are marked in thick lines. The final goal is to determine a point from B, C, and D and only one path from A to this point.

The present disclosure provides a mechanism termed as wish-realization-distance (WRD) function that can dynamically measure the distance between the wish and the realization process reflected by the transmission from one vertex to another in the DAG space. WRD considers the matching degree of wish and realization, the story and video quality of the realization process, the latency between wish making and realization, the potential user exploration opportunities during the process, and so on. With the WRD function, the problem mentioned above can be converted to an easier problem of finding minimum value for a list of distance (e.g., AB, AC, AD) in the DAG.

If $P(V_{x,y}, V_{rx,ry})$ represents the path of the selected edges that has a minimum WRD among all possible choices, ideally it represents the best match between the user's intent and the path of realization, the best quality of the realization process, the lowest latency between wish and realization, and the richest exploration opportunity, simultaneously. However, in practice it is very challenging for $P(V_{x,y}, V_{rx,ry})$ to win out in all these components, thus it is more reasonable to use a joint cost function for WRD to make $P(V_{x,y}, V_{rx,ry})$ to win out with tradeoffs among these components.

If w represents the intent passed from the User Intent Recognizer module that derives from the wish the user currently made, $M(w, V_{x,y}, V_{rx,ry})$ the matching degree between the user's intent and the outcome of realization, and the value of M function is in the range of [0.0, 1.0] and the larger the better match. As typically the user's intent is to change the status of a character or prevent a change, which is something related to the actions of punish, save, forgive, win, escape, seek and so on, thus the status change between $V_{x,y}$ and $V_{rx,ry}$ can be used effectively to compare with the user intent to calculate $M(w, V_{x,y}, V_{rx,ry})$. To simplify the system, M function only considers the starting and ending status of the characters, while we did not consider using the trajectory of the character's status change in the path of $P(V_{x,y}, V_{rx,ry})$ (as example shown in FIG. 6) to determine the degree of its alignment with the intent, although this could be a good direction to explore and the matching degree is indeed a critical factor in selecting the path for realization.

For the latency factor, $T(V_{x,y}, V_{rx,ry})$ represents the minimum video time period for all paths between $V_{x,y}$ and $V_{rx,ry}$, assuming $T(V_{x,y}, V_{x+1,yy})$ the video session time for the path between connected vertex pair $V_{x,y}$ and $V_{x+1,yy}$, then $T(V_{x,y}, V_{rx,ry})$ can be calculated recursively as:

$$T(V_{x,y}, V_{rx,ry}) = \text{Minimum}[T(V_{x,y}, V_{x+1,yy}) + T(V_{x+1,yy}, V_{rx,ry})] \text{ for all vertices } V_{x+1,yy} \text{ connected directly to } V_{x,y}$$

where $T(V_{x+1,yy}, V_{rx,ry}) = 0$ if $rx = x+1$. (1)

For the exploration opportunity factor, the number of scenes contained in the story may be considered, assuming the more new scenes the more opportunities for users to explore. In order to simplify the system, duplicated scenes may be tolerated and the system may calculate all the scenes that have been in and out during the story process. $S(V_{x,y}, V_{rx,ry})$ represents the maximum total number of scenes introduced by the steps between $V_{x,y}$ and $V_{rx,ry}$, so it may be calculated as:

$$S(V_{x,y}, V_{rx,ry}) = \text{Maximum}[S(V_{x,y}, V_{x+1,yy}) + S(V_{x+1,yy}, V_{rx,ry})] \text{ for all vertices } V_{x+1,yy} \text{ connected directly to } V_{x,y}$$

where $S(V_{x+1,yy}, V_{rx,ry}) = 0$ if $rx = x+1$. (2)

For the quality factor, we need to evaluate every step of the $P(V_{x,y}, V_{rx,ry})$ that minimize WRD, and make sure its quality is above a pre-defined standard (e.g., $Q_{Threshold}$). If $Q(P(V_{x,y}, V_{rx,ry}))$ represents the quality of the path $P(V_{x,y}, V_{rx,ry})$, it may be calculated as:

$$Q(P(V_{x,y}, V_{rx,ry})) = \text{Minimum}[q(V_1, V_2), \text{ for any edge } (V_1, V_2) \text{ in } P(V_{x,y}, V_{rx,ry})], \quad (3)$$

where $q(V_1, V_2)$ function measures the quality of a step. This means that any step of low quality will bring down the evaluation of all the longer video clip containing this step.

Now, WRD may be defined as a combination of the functions of M, T, and S with the following calculation process:

$$WRD(w, V_{x,y}, V_{rx,ry}) = a*[1.0 - V_{x,y}, V_{rx,ry})]b* T(V_{x,y}, V_{rx,ry}) - (1-a-b)*S(V_{x,y}, V_{rx,ry}), \quad (4)$$

where a and b in the range of [0.0, 1.0] are parameters for system to adjust the weight of components M, T and S; Thus in order to minimize WRD, the matching degree M and exploration opportunity S are maximized, and the latency T is minimized.

Given a $V_{x,y}$, considering all the possible candidates of $\{V_{rx,ry}\}$ and all the possible paths, we are solving a problem of Minimize $WRD(w, V_{x,y}, V_{rx,ry})$ such that
$Q(P(V_{x,y}, V_{rx,ry})) >= Q_{Threshold}$ (5)

The Storytelling Engine may work in the following process:
1. Once there is a new story and its associated video are available from the Scalable Hyper-story Generator and Video Generator, the functions T and S in Eqs. (1) and (2) are recalculated and stored for all combinations of vertices in the DAG space.
2. Once a wish w is received at a time close to vertex $V_{x,y}$:
   a. all vertices Vrx,ry in the future L steps (L is a parameter configurable by the system) are considered, and the one satisfies Eq. (5) is selected with the path of P(Vx,y, Vrx,ry);
   b. if S(w, Vx,y, Vrx, ry) is lower than a configurable confident level, then the user will be notified that "the wish cannot be realized in the current hyper-story";
   c. otherwise, the latency for realization T(Vx,y, Vrx,ry) is notified to the user with the confidence level of M(w, Vx,y, Vrx, ry).

The Output Video Scheduler may be configured to dynamically schedule the video streams according to the decision of Storytelling Engine, and pass desired video clips to be displayed on the TV display.

It is noted that the IDEO framework also works for the single-ending story, as the single-ending story with only one path is a minimum extreme case for a hyper-story. Although some of the users' wishes may not be able to effectively addressed due to the limitation of the branches contained in the story, the freely switching between viewing and exploration modes as well as the avatar/objects interactions offer attractive features for the user.

The current design of the IDEO framework shown in FIG. 3 may be utilized to handle single-ending story without any change as the single-ending story can be treated as a minimum extreme of Hyper-story.

Referring back to FIG. 3, the Experience mode Switcher is configured to handle the user requests of switching among the modes shown in FIG. 2. Once the Storytelling Engine receives the requested mode from this module, it may decide which branches in the hyper-story will be utilized to complete the goal. For 2D and 3D presentations, different modules may be called to generate different output to user.

The Story-Smart Conversation Engine provides conversation functionalities of smart objects and avatar using the deep neural network models trained by the Environmental AI engine. The Avatar Path Planner may be activated when user permits avatar to explore the 3D scenes by itself and user switches to 3D exploration mode. It may use the learning models trained by the Environmental AI Engine to guide the avatar to move inside the scenes and interact with neighboring smart objects. The 3D Rendering module renders the 3D scene to the user following guidance of the Story-smart Conversation Engine, Avatar Path Planner, and the 3D data passed from the database.

Using the IDEO system shown in FIG. 3, the user may make wish at any time using various interaction mechanisms, and the system may respond to his/her request right away and notify how soon the user's wish may be realized in the storytelling and in what confidence level. On the other hand, the user may switch freely among the TV watching and 3D environment exploration experiences at any time. The AI-enabled smart objects and avatar may effectively extend the original 2D video presentation of a story into a new manner of interactive experiences in the 3D scene with immersive sensation. By combining the user's wish mechanism, which may change the original story to a completely different story, and the experience switching mechanism, which enables user more immersive and interactive sensation, the IDEO experience may attract the user to repeat experiencing the story with different wishes at various times and with richer curation journey. IDEO may transform the traditional TV watching experience implicitly into an exploration experience with user's spontaneous engagement. The 3D space may be considered as an optional companion layer for the 2D video, thus if there is any conditions or constraints that limit the successful presentation of 3D space exploration experience, an IDEO may be consumed as a simple 2D video.

Figure 10:
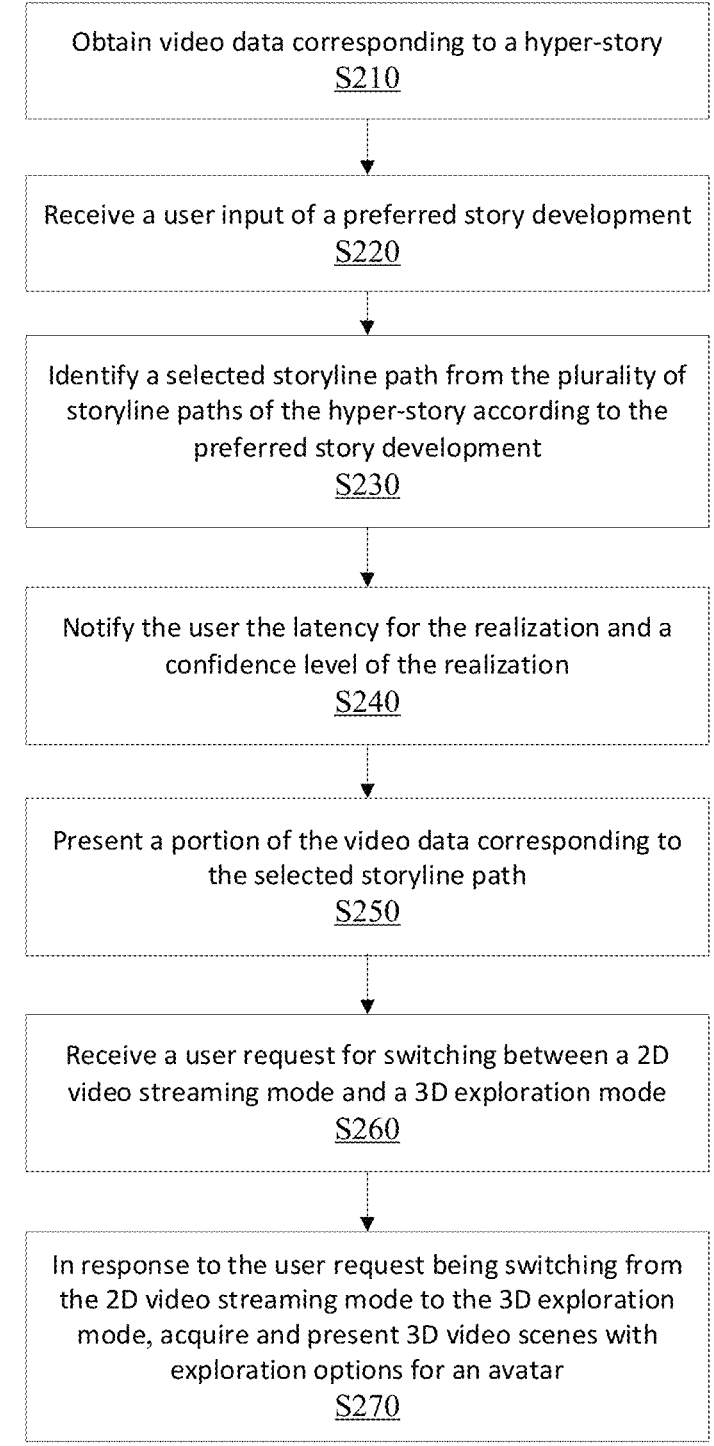
FIG. 10 illustrates an interactive video presentation method implemented by the IDEO system and device.

FIG. 10 illustrates an interactive video presentation method 200 implemented by the IDEO system and device illustrated in FIG. 3 and FIG. 4 according to certain embodiments. The interactive video presentation method 200 may include the following steps. As shown by FIG. 10, the method may include the following steps.

Step 210 is to obtain video data corresponding to a hyper-story. According to certain embodiments, the hyper-story may be machine-generated. According to certain other embodiments, the hyper-story may be generated by a story writer and inputted to the electronic device. The hyper-story may include a plurality of storyline paths, the story further including a plurality of character statuses corresponding to a plurality of story characters at a plurality of time points of the story. After the hyper-story is acquired, the electronic device may create video data according to the hyper-story and store the video in a memory device. In certain embodiments, 3D scenes associated with the video may also be stored, so that the user may enter the 3D scene (via the avatar) anytime during the video playback process.

Step 220 is to receive a user input of a preferred story development. According to certain embodiments, the user input for the preferred story development includes a voice input or a hand gesture input. The user input may be interpreted to determine the preferred story development. For example, if the user input is a voice input, the electronic device may perform a natural language processing to convert the user input to a wish command. If the user input is a hand gesture, the electronic device 100 may perform a hand gesture analysis to determine a user selection from a menu displayed by the displayed interface.

Step 230 is to identify a selected storyline path from the plurality of storyline paths of the hyper-story according to the preferred story development. According to certain embodiments, the hyper-story may be represented with the DAG matrix having a size of M×N to represent a DAG space of the hyper-story. M is the number of all combinations of character statuses for the plurality of story characters. N is the number of the time points. Each vertex of the matrix representing a combination of character status at a time point. In certain embodiments, the process may include: identifying a starting vertex in the matrix corresponding to a current time point and a current combination of character statuses; performing a minimization process of a wish-realization-distance (WRD) function to identify a connection path connecting a plurality of vertexes in the DAG space, the connection path starting at the starting vertex and ending at an outcome vertex, wherein the minimization process dynamically measures and minimizes a distance between the preferred story development and a realization process represented by the connection path while taking into account one or more of: a matching degree of wish and realization, a story and video quality of the realization process, a latency between wish making and realization, and potential user exploration opportunities during the process. The minimization process of the WRD function may be performed according to Equations (1)-(5). For example, the minimization process of the WRD function may include: calculating, by the processor, a matching degree between the preferred story development and the outcome of the connection path; calculating, by the processor, a latency factor accounting for a minimum time duration of all paths between the starting vertex and the outcome vertex; calculating, by the processor, an opportunity factor accounting for a maximum total number of scenes of all paths between the starting vertex and the outcome vertex; calculating, by the processor, a quality factor accounting for a minimum quality of all steps in the connection path; calculating, by the processor, the WRD function as a weighted sum of the matching degree, the latency factor, and the opportunity factor, wherein a first weighting coefficient for the matching degree$<=0$, a second weighting coefficient for the latency factor$>=0$, and a third weighting coefficient for the opportunity factor$>=0$; and identifying the connection path by finding a path corresponding to a minimum value of the WRD function while maintaining the quality factor above a threshold.

Step 240 is to notify the user the latency for the realization and a confidence level of the realization. According to certain embodiments, when the user makes a wish via an interaction at any time of the story progression, the electronic device may recognize the user's immediate intention, and then dynamically guide the storytelling engine to meet his/her expectation. Depending on the availability of story branches, the IDEO system may try to find an optimal solution and notify user sometimes even if the confidential level is not high enough. The electronic device may also notify the user in how long his/her wish will be realized and a level of confidence.

Step 250 is to present a portion of the video data corresponding to the selected storyline path. In certain embodiments, after the hyper-story is acquired, the electronic device may create video data according to the hyper-story and store the video in a memory device. After the selected storyline path has been identified, the electronic device may identify a portion of the video data corresponding to the selected storyline path and stream the portion of the video data.

Step 260 is to receive a user request for switching between a two-dimensional (2D) video streaming mode and a three-dimensional (3D) exploration mode. Step 270 is to, in response to the user request being switching from the 2D video streaming mode to the 3D exploration mode, acquire and present 3D video scenes with exploration options for an avatar. The 3D video scenes may correspond to a current story status and currently presented video data. According to certain embodiments, the 3D video scenes with exploration options may include 3D environment scene changes according to a movement path of the avatar. In certain embodiments, the movement path of the avatar may be generated automatically without user input. In certain other embodiments, the avatar may be operated by the user according to user instructions. In certain embodiments, animation contents may be generated corresponding to interactions between an object in the 3D space and the avatar. The interactions between the object and the avatar may include a dialog. The object may express, during the dialog, one or more of: a lawful opinion, a chaotic opinion, a wise opinion, an educational opinion, or a random opinion. In certain embodiments, the 3D video scenes with exploration options are generated using neural network processing based on trained models of character responses. In certain embodiments, the method further includes switching from the 3D exploration mode back to the 2D video streaming mode according to the user request.

The method and apparatus provided in the present disclosure according to the embodiments are described in detail above. The principles and implementation manners provided in the present disclosure are described herein by using specific examples. The description of the above embodiments is only used to help understand the method provided in the present disclosure. At the same time, a person skilled in the art will make changes the specific embodiments and the application scope according to the idea provided in the present disclosure. In summary, the contents of the present specification should not be construed as limiting the present disclosure.

The present disclosure contains material that is subject to copyright protection. The copyright is the property of the copyright holder. The copyright holder has no objection to the reproduction of patent documents or patent disclosure in the official records and files of the Patent and Trademark Office.

What is claimed is:

1. A method for generating and presenting a video by an electronic device having a processor, comprising:
   obtaining, by the electronic device, video data corresponding to a story;
   presenting, through a display interface, a portion of the video data corresponding to a selected storyline path of the story;
   receiving, by the input interface, a user request for switching between a two-dimensional (2D) video streaming mode and a three-dimensional (3D) exploration mode; and
   in response to the user request being switching from the 2D video streaming mode to the 3D exploration mode:
   acquiring, by the processor, 3D video scenes with exploration options for an avatar, the 3D video scenes matched to a current story status and currently presented video data; and presenting, through the display interface, the 3D video scenes with the exploration options.

2. The method according to claim 1, wherein acquiring 3D video scenes with exploration options includes:
   generating a movement path for the avatar in a 3D space; and
   acquiring 3D environment scene changes according to the movement path.

3. The method according to claim 2, wherein acquiring 3D video scenes with exploration options further includes:
   receiving user instructions to operate the avatar in the 3D space; and
   generating the movement path according to the user instructions.

4. The method according to claim 3, wherein acquiring 3D video scenes with exploration options further includes:
   generating and presenting animation contents corresponding to interactions between an object in the 3D space and the avatar.

5. The method according to claim 4, wherein the interactions between the object and the avatar includes a dialog, and the object expresses, during the dialog, one or more of: a lawful opinion, a chaotic opinion, a wise opinion, an educational opinion, or a random opinion.

6. The method according to claim 5, wherein the 3D video scenes with exploration options are generated using neural network processing based on trained models of character responses.

7. The method according to claim 1, wherein:
   the story is hyper-story including a plurality of storyline paths, and further including a plurality of character statuses corresponding to a plurality of story characters at a plurality of time points of the story; and
   the method further includes:
   receiving, via an input interface, a user input of a preferred story development; and
   identifying, by the processor, the selected storyline path from the plurality of storyline paths of the hyper-story according to the preferred story development.

8. The method according to claim 7, wherein:
   the user input for the preferred story development includes a voice input or a hand gesture input; and
   the method further includes interpreting the user input to determine the preferred story development, including:
   performing a natural language processing to convert the user input to a wish command; or
   performing a hand gesture analysis to determine a user selection from a menu displayed by the displayed interface.

9. The method according to claim 7, wherein identifying the selected storyline path according to the preferred story development includes:
   obtaining, by the processor, a directed acyclic graph (DAG) matrix having a size of M×N to represent a DAG space of the hyper-story, M being a number of all combinations of character statuses for the plurality of story characters, N being a number of the time points, and each vertex of the matrix representing a combination of character status at a time point;
   identifying, by the processor, a starting vertex in the matrix corresponding to a current time point and a current combination of character statuses;
   performing, by the processor, a minimization process of a wish-realization-distance (WRD) function to identify a connection path connecting a plurality of vertexes in the DAG space, the connection path starting at the starting vertex and ending at an outcome vertex, wherein the minimization process dynamically measures and minimizes a distance between the preferred story development and a realization process represented by the connection path while taking into account one or more of: a matching degree of wish and realization, a story and video quality of the realization process, a latency between wish making and realization, and potential user exploration opportunities during the process.

10. The method according to claim 9, wherein the minimization process of the WRD function includes:
   calculating, by the processor, a matching degree between the preferred story development and the outcome of the connection path;
   calculating, by the processor, a latency factor accounting for a minimum time duration of all paths between the starting vertex and the outcome vertex,
   calculating, by the processor, an opportunity factor accounting for a maximum total number of scenes of all paths between the starting vertex and the outcome vertex;
   calculating, by the processor, a quality factor accounting for a minimum quality of all steps in the connection path;
   calculating, by the processor, the WRD function as a weighted sum of the matching degree, the latency factor, and the opportunity factor, wherein a first weighting coefficient for the matching degree<=0, a second weighting coefficient for the latency factor>=0, and a third weighting coefficient for the opportunity factor>=0; and identifying the connection path by finding a path corresponding to a minimum value of the WRD function while maintaining the quality factor above a threshold.

11. The method according to claim 9, further comprising:
before presenting the portion of the video data corresponding to the selected storyline path, notifying, by the display interface, the latency for the realization and a confidence level of the realization.

12. A device for performing computer-aided diagnosis (CAD) based on a medical image, comprising:
a memory, storing computer-executable instructions; and
a processor, coupled with the memory and, when the computer-executable instructions being executed, configured to:
obtain video data corresponding to a story;
present, via a display interface, a portion of the video data corresponding to a selected storyline path of the story;
receive a user request for switching between a two-dimensional (2D) video streaming mode and a three-dimensional (3D) exploration mode; and
in response to the user request being switching from the 2D video streaming mode to the 3D exploration mode: acquire 3D video scenes with exploration options for an avatar, the 3D video scenes matched to a current story status and currently presented video data; and presenting, via the display interface, the 3D video scenes with the exploration options.

13. The device according to claim 12, wherein the processor is further configured to:
generate a movement path for the avatar in a 3D space; and
acquire 3D environment scene changes according to the movement path.

14. The device according to claim 13, wherein the processor is further configured to:
receive user instructions to operate the avatar in the 3D space; and
generate the movement path according to the user instructions.

15. The device according to claim 14, wherein the processor is further configured to:
generate and present animation contents corresponding to interactions between an object in the 3D space and the avatar.

16. The device according to claim 11, wherein:
the story is hyper-story including a plurality of storyline paths, and further including a plurality of character statuses corresponding to a plurality of story characters at a plurality of time points of the story; and
the processor is further configured to:
receive, via an input interface, a user input of a preferred story development; and
identify the selected storyline path from the plurality of storyline paths of the hyper-story according to the preferred story development.

17. The device according to claim 16, wherein:
the user input for the preferred story development includes a voice input or a hand gesture input; and
the processor is further configured to:
perform a natural language processing to convert the user input to a wish command; or
perform a hand gesture analysis to determine a user selection from a menu displayed by the displayed interface.

18. The device according to claim 16, wherein the processor is further configured to:

obtain a directed acyclic graph (DAG) matrix having a size of M×N to represent a DAG space of the hyper-story, M being a number of all combinations of character statuses for the plurality of story characters, N being a number of the time points, and each vertex of the matrix representing a combination of character status at a time point;
identify a starting vertex in the matrix corresponding to a current time point and a current combination of character statuses;
perform a minimization process of a wish-realization-distance (WRD) function to identify a connection path connecting a plurality of vertexes in the DAG space, the connection path starting at the starting vertex and ending at an outcome vertex, wherein the minimization process dynamically measures and minimizes a distance between the preferred story development and a realization process represented by the connection path while taking into account one or more of: a matching degree of wish and realization, a story and video quality of the realization process, a latency between wish making and realization, and potential user exploration opportunities during the process.

19. The device according to claim 18, wherein the processor is further configured to:
calculate a matching degree between the preferred story development and the outcome of the connection path;
calculate a latency factor accounting for a minimum time duration of all paths between the starting vertex and the outcome vertex,
calculate an opportunity factor accounting for a maximum total number of scenes of all paths between the starting vertex and the outcome vertex;
calculate a quality factor accounting for a minimum quality of all steps in the connection path;
calculate the WRD function as a weighted sum of the matching degree, the latency factor, and the opportunity factor, wherein a first weighting coefficient for the matching degree<=0, a second weighting coefficient for the latency factor>=0, and a third weighting coefficient for the opportunity factor>=0; and
identify the connection path by finding a path corresponding to a minimum value of the WRD function while maintaining the quality factor above a threshold.

20. A non-transitory computer-readable storage medium storing a plurality of instructions, wherein when the plurality of instructions are executed by a processor, cause the processor to:
obtain video data corresponding to a story;
present, via a display interface, a portion of the video data corresponding to a selected storyline path of the story;
receive a user request for switching between a two-dimensional (2D) video streaming mode and a three-dimensional (3D) exploration mode; and
in response to the user request being switching from the 2D video streaming mode to the 3D exploration mode: acquire 3D video scenes with exploration options for an avatar, the 3D video scenes matched to a current story status and currently presented video data; and presenting, via the display interface, the 3D video scenes with the exploration options.

* * * * *